(12) United States Patent
Choi

(10) Patent No.: US 10,617,984 B2
(45) Date of Patent: Apr. 14, 2020

(54) TAILORED MULTILAYERED NANO-FIBROUS FILTRATION MEDIA AND METHOD OF MAKING

(71) Applicant: Kyung-Ju Choi, Louisville, KY (US)

(72) Inventor: Kyung-Ju Choi, Louisville, KY (US)

(73) Assignee: Clean and Science Company, Ltd., Rolling Meadows, IL (US)

( * ) Notice: Subject to any disclaimer, the term of this patent is extended or adjusted under 35 U.S.C. 154(b) by 28 days.

(21) Appl. No.: 15/326,574

(22) PCT Filed: Apr. 17, 2015

(86) PCT No.: PCT/US2015/026549
§ 371 (c)(1),
(2) Date: Jan. 16, 2017

(87) PCT Pub. No.: WO2016/167815
PCT Pub. Date: Oct. 20, 2016

(65) Prior Publication Data
US 2018/0056220 A1    Mar. 1, 2018

(51) Int. Cl.
*B01D 29/05*    (2006.01)
*B01D 39/16*    (2006.01)
*B01D 39/00*    (2006.01)

(52) U.S. Cl.
CPC ......... *B01D 39/1623* (2013.01); *B01D 29/05* (2013.01); *B01D 39/00* (2013.01);
(Continued)

(58) Field of Classification Search
CPC ............ B01D 2201/188; B01D 29/012; B01D 2239/0208; B01D 2239/0216;
(Continued)

(56) References Cited

U.S. PATENT DOCUMENTS 7,390,443 B1 * 6/2008 Choi .................. B01D 39/00
                                                                264/6
8,152,889 B2   4/2012 Choi
(Continued)

OTHER PUBLICATIONS

International Search Report and Written Opinion, PCT/US2015/026569, Choi, dated Jul. 7, 2015.

*Primary Examiner* — Pranav N Patel
(74) *Attorney, Agent, or Firm* — Witters & Associates; Steve Witters

(57) ABSTRACT

A tailored multilayered nano-fibrous filtration media having at least two adjacent layers of nano-fibrous media and a method for making is presently disclosed. The method comprises selecting an overall mean flow pore size for tailoring the multilayered nano-fibrous filtration media, choosing a first layers of nano-fibrous media, calculating an overall mean flow pore size (OMFP) of the tailored multilayered nano-fibrous filtration media, determining if the calculated OMFP is approximately equal to the selected OMFP, if not approximately equal then choosing a different number of layers chosen or choosing at least one layer having a porosity or mean flow pore size different than the previously chosen layer of nano-fibrous media, and adjacently layering each finally chosen layer of nano-fibrous media.

10 Claims, 4 Drawing Sheets

(52) U.S. Cl.
CPC .. *B01D 2239/025* (2013.01); *B01D 2239/065* (2013.01); *B01D 2239/1216* (2013.01)

(58) Field of Classification Search
CPC .... B01D 2239/10; B01D 39/00; B01D 39/06; B32B 2250/20; B32B 2250/02; B32B 2250/03; B32B 2250/04; B32B 2250/05; B32B 2250/40; B32B 2250/42; B32B 2260/023; B32B 2307/724; B32B 2307/726; B32B 27/12; B32B 5/02; B32B 5/12; B32B 5/36
See application file for complete search history.

(56) References Cited

U.S. PATENT DOCUMENTS

| | | |
|---|---|---|
| 8,523,971 B2 | 9/2013 | Leung et al. |
| 2008/0245041 A1* | 10/2008 | Choi ................ B01D 39/163 55/524 |
| 2013/0256230 A1 | 10/2013 | Dullaert et al. |
| 2014/0367325 A1 | 12/2014 | Choi et al. |

* cited by examiner

TAILORED MULTILAYERED NANO-FIBROUS FILTRATION MEDIA AND METHOD OF MAKING

CROSS-REFERENCE TO RELATED APPLICATION

This patent application is a U.S. National Phase Application under 35 U.S.C. § 371 of International Application No. PCT/US2015/026549, filed Apr. 17, 2015, entitled TAILORED MULTILAYERED NANO-FIBROUS FILTRATION MEDIA AND METHOD OF MAKING, the entire disclosures of which are incorporated herein by reference.

FIELD OF THE DISCLOSURE

This disclosure relates generally to fluid filter materials having multiple layers of nano-fibrous filtration media.

BACKGROUND

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

Nano-fibrous filtration media is known. However, challenges remain in tailoring a nano-fibrous filtration media to have selected properties such as an overall mean flow pore size or pore size distribution.

SUMMARY

In at least one aspect of the present disclosure, a method for making a tailored multilayered nano-fibrous filtration media comprising at least two adjacent layers of nano-fibrous media is provided. The method comprising the steps of: a) selecting an overall mean flow pore size for tailoring the multilayered nano-fibrous filtration media; b) choosing a first layer of nano-fibrous media having a first porosity and a first mean flow pore size; c) choosing an i-th layer of nano-fibrous media having an i-th porosity and an i-th mean flow pore size; d) calculating an overall mean flow pore size of the tailored multilayered nano-fibrous filtration media using the equation:

$$OMFP = 1 \bigg/ \prod_1^n \varepsilon_i \left( \sum_1^n \frac{1}{d_i} \right)$$

wherein OMFP is the calculated overall mean flow pore size of multilayered nano-fibrous filtration media: $\varepsilon_i$ is the porosity of each chosen nano-fibrous media layer; $d_i$ is the pore diameter of each chosen nano-fibrous media layer; and n is the total number of chosen nano-fibrous media layers; e) determining if the calculated OMFP is approximately equal to the selected overall mean flow pore size for tailoring the multilayered nano-fibrous filtration media; f) if the calculated OMFP is not approximately equal to the selected overall mean flow pore size for tailoring the multilayered nano-fibrous filtration media then repeating steps b) through e) until finally chosen nano-fibrous media layers are determined to have a calculated OMFP approximately equal to the selected overall mean flow pore size for tailoring the multilayered nano-fibrous filtration media, wherein each repetition of steps b) through e) a different number of layers are chosen or at least one of the steps b) and c) comprise choosing a nano-fibrous media layer having a porosity or mean flow pore size different than the previously chosen layer of nano-fibrous media; and g) adjacently layering each finally chosen layer of nano-fibrous media.

In another aspect of the present disclosure, the tailored multilayered nano-fibrous filtration media made according to the above method for making a tailored multilayered nano-fibrous filtration media is provided.

In a further aspect of the present disclosure, a tailored multilayered nano-fibrous filtration media comprising at least two adjacent nano-fibrous media layers and having an actual overall mean flow pore size approximately equal to a calculated overall mean flow pore size is provided. The calculated overall mean flow pore size of the tailored multilayered nano-fibrous filtration media is calculated using the equation:

$$OMFP = 1 \bigg/ \prod_1^n \varepsilon_i \left( \sum_1^n \frac{1}{d_i} \right)$$

wherein OMFP is the calculated overall mean flow pore size of multilayered nano-fibrous filtration media: $\varepsilon_i$ is the porosity of each nano-fibrous media layer; $d_i$ is the pore diameter of each nano-fibrous media layer; and n is the total number of nano-fibrous media layers.

BRIEF DESCRIPTIONS OF THE DRAWINGS

The following figures, which are idealized, are not to scale and are intended to be merely illustrative of aspects of the present disclosure and non-limiting. In the drawings, like elements are depicted by like reference numerals. The drawings are briefly described as follows.

FIG. 1 is an illustration showing: A: a pore in layer 1, B: a pore in layer 2, and C: a pore created from a combination of layers 1 and 2 by means of collating or layering layer 1 with layer 2;

DETAILED DESCRIPTION

Figure 1:
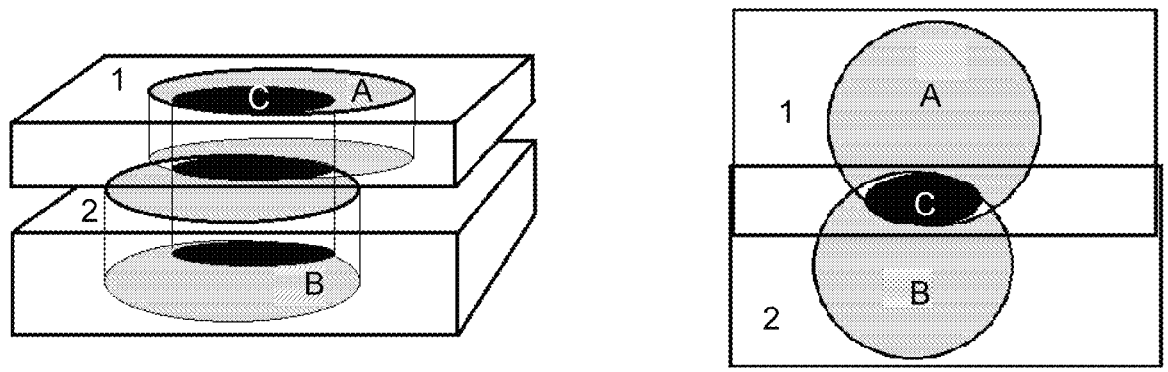

Reference will now be made in detail to the present exemplary embodiments and aspects of the present invention, examples of which are illustrated in the accompanying figures. As used herein, the term fluid means gas, liquid, or other flowable material.

Embodiments of the presently disclosed multilayered nano-fibrous filtration media comprises at least two adjacent layers of nano-fibrous media.

One or more of the layers of the nano-fibrous media may comprise, consist essentially of, or consist of ePTFE, nano fibrous materials made by electro-spinning, and/or forcespinning. For example, in 1934, U.S. Pat. No. 1,975,504 was granted to Formhals, A, entitled "Process and apparatus for preparing artificial threads". The concept of applying an electrical force between the capillary tip and collector by a high voltage source was disclosed therein. The pendent droplet of the polymer solution from a capillary tip was divided into multiple fibrils in a conical shape, "Taylor cone", unto the metallic collector, when the intensity of the electrical field overcomes the surface tension of a polymer solution. However, electro-spinning may present issues, in some applications, such as solvent recovery, since solvents for most polymers are organic and harmful, slow process, weak strength, and fire incident.

In applications where the issues associated with electro-spinning present much difficulty to overcome, layers of porous ePTFE nano-fibrous media may be used. One or more of the layers of presently disclosed tailored multilayered nano-fibrous filtration media may comprise, consist essentially of, or consist of expanded polytetrafluoroethylene (ePTFE). An ePTFE layer or membrane may provide one or more advantages over other or conventional microfiltration media. For example, ePTFE may provide for a nano-fibrous media having a higher durability, increased hydrophobicity, better chemical and thermal stability, superior cleanliness, higher flexible, higher flow rates, longer service life, and/or a stronger nano-filament structure.

Layers of porous ePTFE nano-fibrous media may have a high melting point and may be chemically inert and/or hydrophobic. ePTFE nano-fibrous media may have nano-filaments and may have a relatively high strength and a smooth surface and may have billions of continuous superfine fibrils interconnected with each other having voids therebetween. For example, biaxially stretching of a sheet of polytetrafluoroethylene may provide a layer of ePTFE nano-filaments having a desired porosity or voids for a layer of the multilayered nano-fibrous filtration media of the present disclosure. Biaxially stretching may be performed by the first stretching longitudinally and then stretching in a transverse direction, perpendicular to the first stretching. For example, a structure ePTFE films or a layer of nano-fibrous media may be produced by uniaxial and/or biaxial stretching of a calendared sheet.

An ePTFE film or layer of nano-fibrous media may also be produced by providing a fine powder PTFE homopolymer. Expansion of the PTFE may be accomplished by beginning with the fine PTFE powder, adding a lubricant, such as Isopar, to form a paste, which may then be extruded under high pressure and sent to a calendaring process to make PTFE tape. After drying to remove the lubricant, the tape may then be fed to the machine direction orienting (MDO) expansion (draw). The PTFE may be given only a uniaxial (constant width) draw, or may also be given a subsequent transverse direction orientation (TDO) stretch in the tenter machine to produce biaxial orientation and expansion of the PTFE.

Aspects of the presently disclosed multilayered nano-fibrous filtration media and method may be disclosed in one or more of US patents or patent applications US 2014/0367325 A1, U.S. Pat. Nos. 8,152,889, 7,959,705, and 7,837,756, each of which is incorporated herein by reference in its entirety. Aspects of the presently disclosed multilayered nano-fibrous filtration media may be disclosed in K-J Choi and J. E. Spruiell, J. Polym Sci. Part B, 48, 2248 (2010) which is incorporated herein by reference in its entirety.

Aspects of the multilayered nano-fibrous filtration media may be useful in microfiltration. Microfiltration is a mechanical filtration process where a contaminated fluid is passed through a membrane with a specific narrow pore size distribution to separate undesired contaminants such as microorganisms and suspended particles from liquid. It is commonly used in addition to various other separation processes such as ultrafiltration. There are three main characteristics to be effective in microfiltration: 1) narrow uniform pore size distribution, 2) high porosity, and 3) thinness with minimum pore size, so as to remove undesired contaminants.

Presently disclosed is a method for making a tailored multilayered nano-fibrous filtration media comprising at least two adjacent layers of nano-fibrous media, and the tailored multilayered nano-fibrous filtration media.

FIG. 1 is an illustration showing: A: a pore in layer 1, B: a pore in layer 2, and C: a pore created from a combination of layers 1 and 2 by means of collating, laminating, or layering layer 1 with layer 2. A theoretical diameter C may be mathematically calculated. The actual pore diameter of multi layer nano-fibrous media may be larger than the theoretical diameter, C, shown in FIG. 1. This larger diameter may be due to a tortuous path created in layering as the pores may have parts extending beyond theoretical diameter C. These extending or remaining parts of pores are not addressed in the theoretical predicted pores C.

Figure 2:
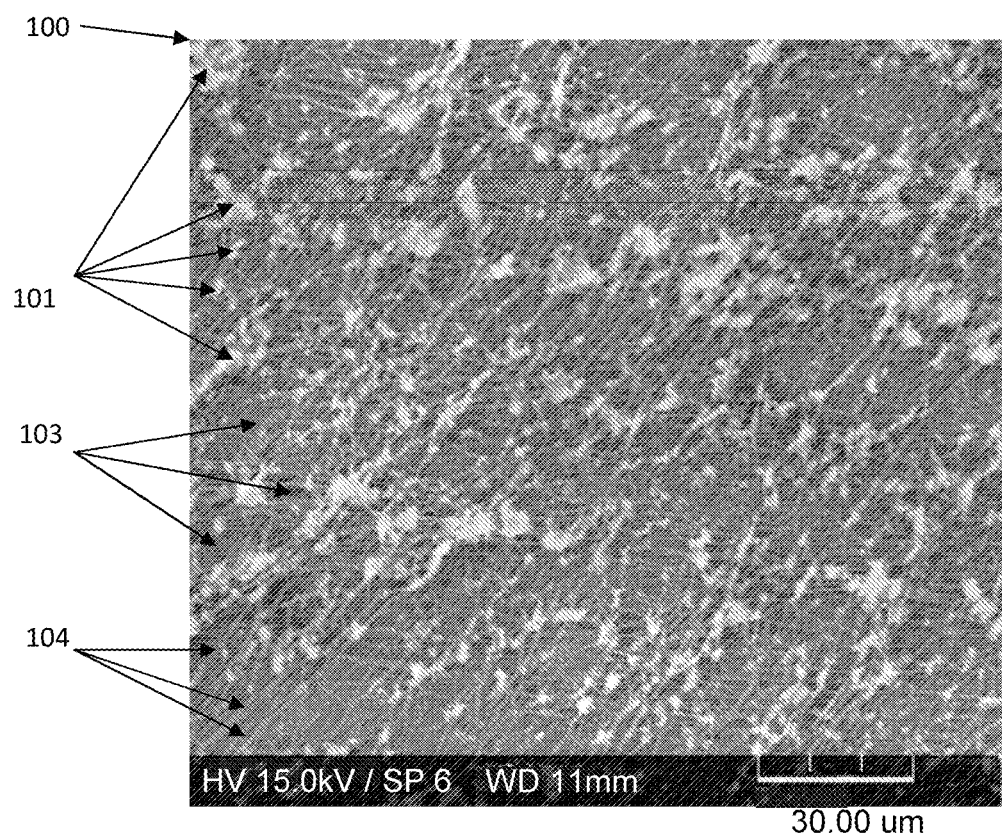
FIG. 2 is an SEM photo of a layer of nano-fibrous media of the present disclosure showing some nodes with open pores.

FIG. 2 is an SEM photo of layer 100 of a nano-fibrous media of the present disclosure showing some nodes with open pores. Layer 100 is an ePTFE nano-fibrous media prepared at a low stretch ratio. Layer 100 has some nodes 101 and open pores 103. Fibrils 104 are in a nano size range between about 30 to 200 nm. The measured pore sizes for layer 100 are as follows: Mean Flow Pore (MFP) Size: 2.45 µm, Maximum Pore Size: 4.44 µm and Minimum Pore Size: 1.99 µm.

Figure 3:
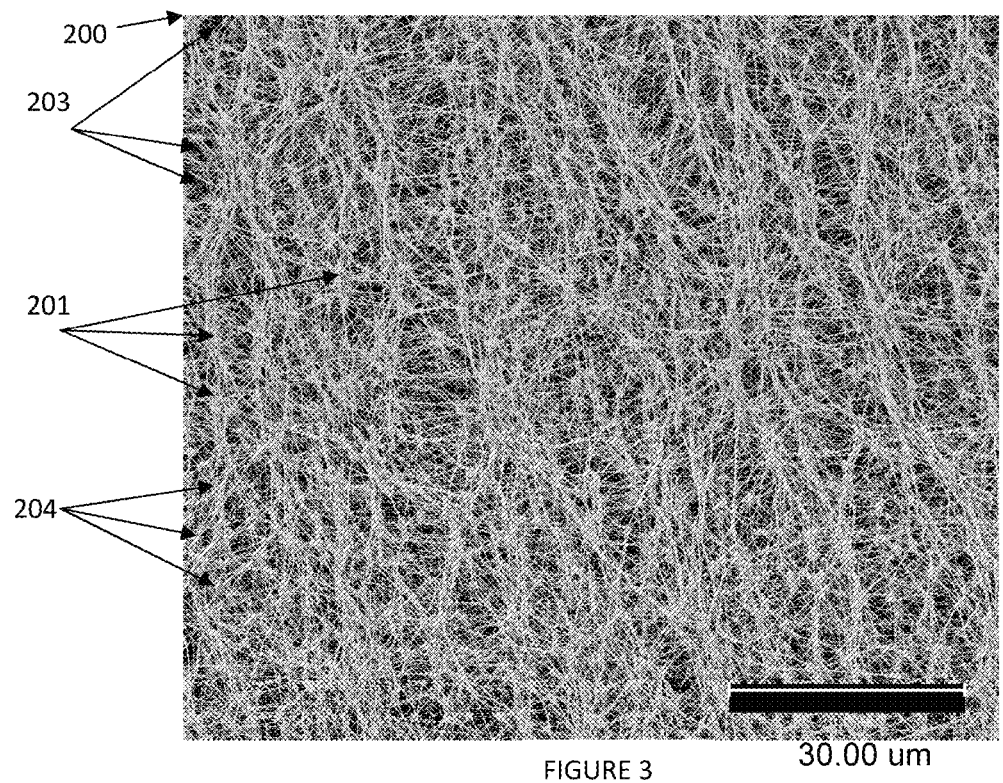
FIG. 3 is an SEM photo of a layer of nano-fibrous media of the present disclosure showing fewer nodes and more fibrils as compared to the nano-fibrous media shown in FIG. 2.

FIG. 3 is an SEM photo of a layer of ePTFE nano-fibrous media 200 of the present disclosure showing fewer nodes and more fibrils as compared to nano-fibrous media 100 shown in FIG. 2. Layer 200 was prepared at a higher stretch ratio than layer 100 and has minimum nodes 201. As shown in FIG. 3, layer 200, has some nodes 201 with open pores 203. The fibrils 204 are in a nano size range between about 30 to 200 nm. The measured pore sizes for layer 200 are as follows: Mean Flow Pore (MFP) Size: 3.72 µm, Maximum Pore Size: 8.08 µm and Minimum Pore Size: 3.40 µm.

Figure 4:
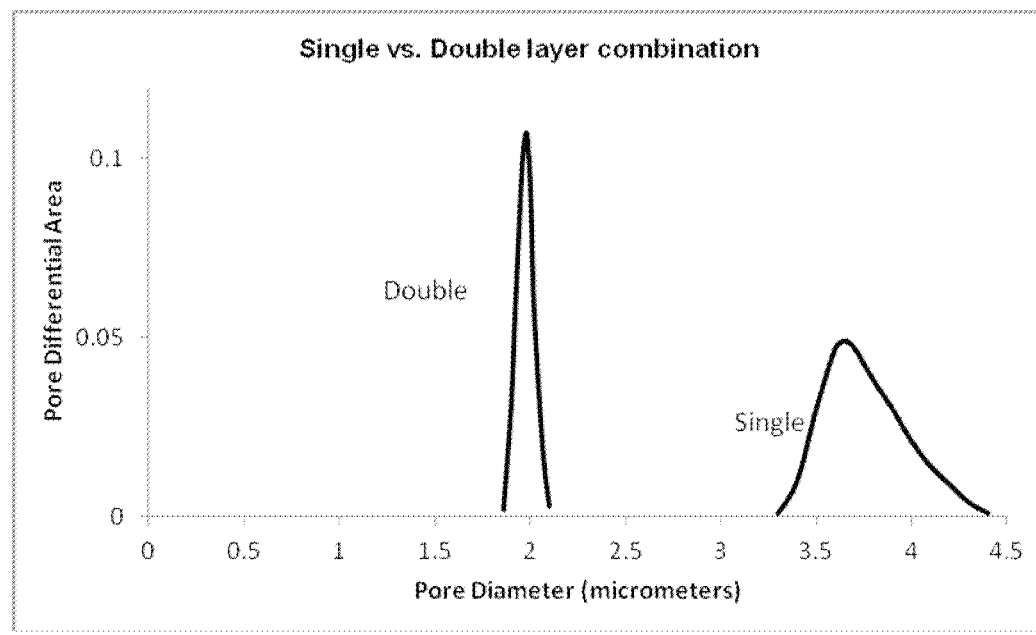
FIG. 4 is a graph showing the measured pore size distributions of a single layer of nano-fibrous media and a double layer of nano-fibrous media.

FIG. 4 is a graph showing the measured pore size distributions of a single layer of nano-fibrous media 200 and a double layer of nano-fibrous media 200. A combination of double layers was prepared by layering two layers of nano-fibrous media 200, each layer 200 having a MFP Size of 3.72 µm, to make a selected tailored multilayered nano-fibrous filtration media having a nominal overall mean flow pore size of 2 µm. The measured pore sizes for the double layer combination were measured and determined to have an actual MFP Size of 1.97 µm, a maximum pore size of 3.98 µm, and minimum pore size of 1.90 µm. Following Eq. 7 below, $1.97=0.5\times 3.72/\varepsilon^2=1.86/\varepsilon^2$. Therefore, the porosity is about 97% as expected through fewer nodes in comparison with a single layer of nano-fibrous media 200.

The graph in FIG. 4 shows the measured pore size distributions of single and double layer combination, each having layer or layers 200. The double layer combination shows again very narrow pore distribution with a peak at 1.97 µm while single layer has a broad pore size distribution with a peak at 3.72 µm.

Figure 5:
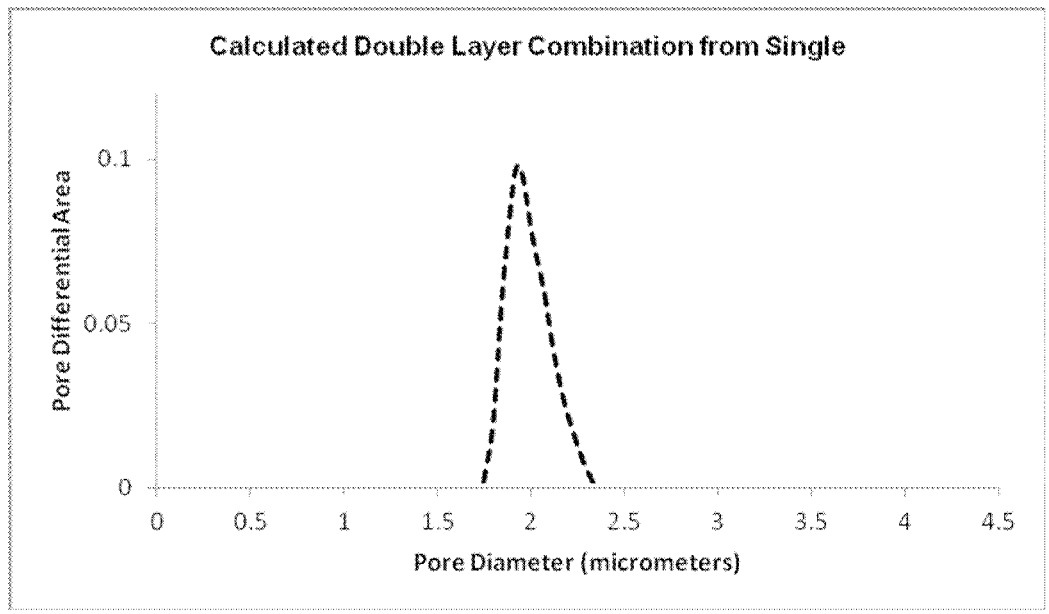
FIG. 5 is a graph showing a calculated pore distribution of a double layer of nano-fibrous media, calculated from data for a single layer of nano-fibrous media.

FIG. 5 shows a graph showing a calculated pore distribution of the double layer of nano-fibrous media 200, calculated from data for a single layer of nano-fibrous media 200 having a MFP Size of 3.72 µm. The calculated pore distribution generally agrees with the experimental, shown as double in FIG. 4, one with the slightly broader pore distribution. This slightly broader pore distribution, between the actual in FIG. 4 and the calculated in FIG. 5, may be due do elimination of pores at both relatively long tails of the single layer 200.

Figure 6:
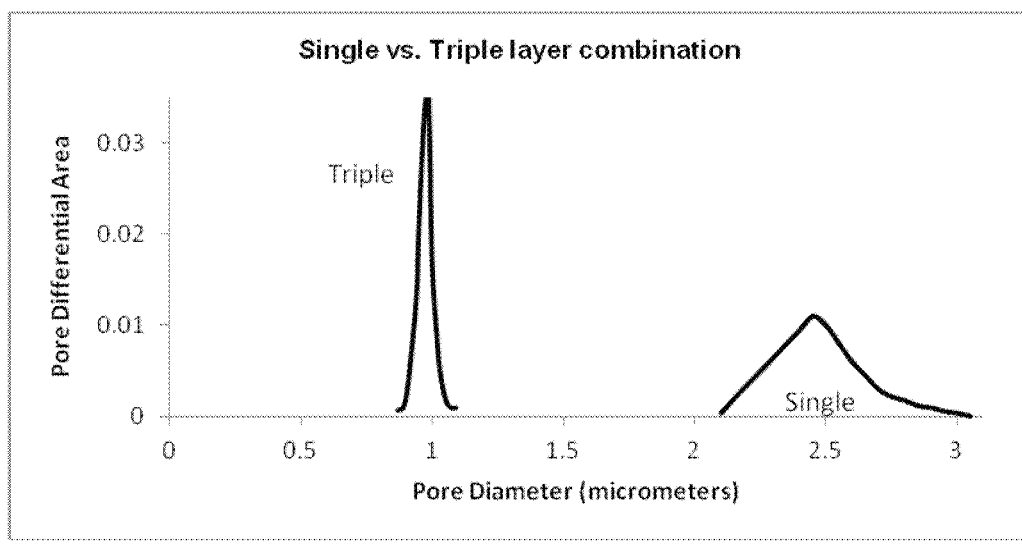
FIG. 6 is a graph showing the measured pore size distributions of a single layer of nano-fibrous media and a triple layer of nano-fibrous media.

FIG. 6 is a graph showing the measured pore size distributions of a single layer of nano-fibrous media 100 and a triple layer of nano-fibrous media 100. A combination of triple layers was prepared by layering three layers of nano-fibrous media 100, each layer 100 having a MFP Size of 2.45 µm, to make a selected tailored multilayered nano-fibrous filtration media having a nominal overall mean flow pore size of 1 µm. The measured pore sizes for the triple layer combination were measured and determined to have an actual MFP Size of 0.974 µm, a maximum pore size of 1.30 µm, and minimum pore size of 0.898 µm. Following Eq. 8 below, 6, $0.974=0.333\times 2.45/\varepsilon^3=0.816/\varepsilon^3$. Therefore, the porosity is about 94%.

The graph in FIG. 6 shows the measured pore size distributions of single and triple layer combination, each having layer or layers 100. The triple layer combination shows very narrow pore distribution with a peak slightly less than 1 µm while single layer has a very broad pore size distribution with a peak at 2.45 µm.

Figure 7:
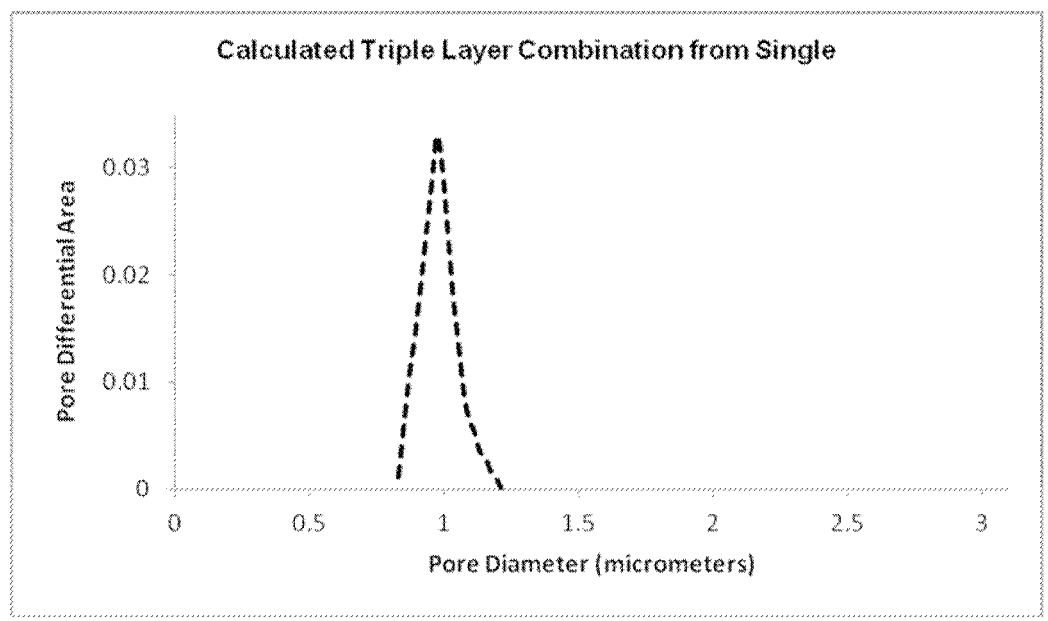
FIG. 7 is a graph showing a calculated pore distribution of a triple layer of nano-fibrous media, calculated from data for a single layer of nano-fibrous media.

FIG. 7 shows a graph showing a calculated pore distribution of the triple layer of nano-fibrous media 100, calculated from data for a single layer of nano-fibrous media 100 having a MFP Size of 2.45 µm. The calculated pore distribution generally agrees with the experimental, shown as triple in FIG. 6, one with the slightly broader pore distribution.

Theoretical Analysis

The capillary pressure, $P_c$ is given by Laplace' equation:

$$P_c = \sigma\left(\frac{1}{R_M} + \frac{1}{R_L}\right) \qquad (1)$$

Where $R_M$ and $R_L$ are the principal radii of curvature and $\sigma$ is the surface tension of liquid. If the surface of interface is part of a sphere and the radius of capillary is r then $$P_c = \frac{2\sigma\cos\theta}{r} \qquad (2)$$

Where θ is the contact angle and r is the radius of capillary. Let R, $r_1$, $r_2$, . . . be the mean flow pore of multilayer media, Layer 1, Layer 2 and so on, and $P_c$, $P_{c1}$, $P_{c2}$, . . . be experimental capillary pressure of multi layer media, Layer 1, Layer 2 and so on. Then, $$P_{c1} = \frac{2\sigma\cos\theta}{r_1} \quad P_{c2} = \frac{2\sigma\cos\theta}{r_2} \quad P_{c3} = \frac{2\sigma\cos\theta}{r_3} \qquad (3)$$

$$P_c = P_{c1} + P_{c2} + P_{c3} \ldots = \frac{2\sigma\cos\theta}{r_1} + \frac{2\sigma\cos\theta}{r_2} + \frac{2\sigma\cos\theta}{r_3} + \ldots = \frac{2\sigma\cos\theta}{R}$$

For example, suppose a pore in Layer 1 is placed on top of a different pore size in layer 2, the theoretical prediction of a pore is much smaller than both pores, depending on the location of interface between two layers. This is illustrated in FIG. 1 wherein A is a pore in Layer 1, B is a pore in Layer 2, and C is a pore created from a combination of Layers 1 and 2 by means of collating or layering Layer 1 on top of Layer 2.

The actual pore diameter or pore size of a multilayered nano-fibrous filtration media may be larger than shown in FIG. 1, because of a tortuous path. This may be because of remaining parts of pores that are not used in theoretical predicted pores C, shown in FIG. 1. Therefore, the tortuosity need be consider in the present analysis. The tortuosity is assumed to be 1/ε. The porosity, ε, is the ratio of the pore volume to the total volume of a layer of nano-fibrous media.

With above assumption considering the tortuosity, Equation 3 becomes $$1/R = \prod_1^n \varepsilon_i \left(\sum_1^n \frac{1}{r_i}\right) \qquad (4)$$

Since MFP is the diameter of the pore, Equation 4 is rewritten as $$1/D = \prod_1^n \varepsilon_i \left(\sum_1^n \frac{1}{d_i}\right) \qquad (5)$$

Here D is the MFP of the multi-layer and $d_i$ is the MFP of ith layer.
Therefore, $$OMFP = 1 \bigg/ \prod_1^n \varepsilon_i \left(\sum_1^n \frac{1}{d_i}\right) \qquad (6)$$

Here i is the number of each layer such as i=1: Layer 1, i=2: Layer 2, and so on, $\Pi_1^n \varepsilon_i$ defines as $\varepsilon_1$ when i=1, $\varepsilon_1 * \varepsilon_2$ when i=2, $\varepsilon_1 * \varepsilon_2 * \varepsilon_3$ when i=3, and so on, n is the total number of layers such as 2 as double layer and D is the mean flow pore size of multilayer media.

For the double layers with same porosity and same MFP:

$$OMFP = 0.5d/\varepsilon^2 \qquad 7$$

Here d is the MFP of a layer before lamination or layering.
For the triple layers with same porosity and same MFP:

$$OMFP = 0.333d/\varepsilon^3 \qquad 8$$

It is important to note that the above analysis may not be applicable if there is significant deformation occurring during the lamination or layering process. In at least one embodiment of the present disclosure, the original properties of each layer should remain substantially the same before and after lamination or layering. Therefore, it may be advantageous to minimize compression or expansion of the layers and/or to layer without binders between layers.

EXAMPLES

Tailored multilayered nano-fibrous filtration medium of the present disclosure were prepared according to the presently disclosed method for making a tailored multilayered nano-fibrous filtration media. The pore properties of the layers of nano-fibrous media were measured by Quantachrome Porometer 3G. The pore size of filter media is identified by the diameter of the particle that it can be expected to retain with a defined, high degree of efficiency. Ratings may be stated as either nominal or absolute pore size. An absolute pore size rating specifies the pore size at which a challenge particular will be retained with 100% efficiency under strictly defined test conditions. Absolute micro-filters are used for critical applications such as sterilizing and final filtration. A nominal pore size rating describes the ability of the filter media to retain the majority of particulate at (60-98%) the rated pore size.

Example 1

A tailored multilayered nano-fibrous filtration media was prepared. An overall mean flow pore size (OMFP) for tailoring the multilayered nano-fibrous filtration media was selected to be a nominal 2 μm. Two layers were chosen for layering, each layer having a MFP size, or diameter d, of 3.72 μm and a porosity, ε, of 0.96.

An overall mean flow pore size of the tailored multilayered nano-fibrous filtration media was calculated using the equation:

$$OMFP = 1 \Big/ \prod_1^n \varepsilon_i \left( \sum_1^n \frac{1}{d_i} \right)$$

wherein OMFP is the calculated overall mean flow pore size of multilayered nano-fibrous filtration media:
$\varepsilon_i$ is the porosity of each chosen nano-fibrous media layer;
$d_i$ is the pore diameter of each chosen nano-fibrous media layer; and
n is the total number of chosen nano-fibrous media layers.
In this example, $d_1=d_2=3.72$ μm and $\varepsilon_1=\varepsilon_2=0.96$ and the calculated OMFP was calculated to be approximately 2 as follows:

OMFP=1/[(0.96*0.96)*(1/3.72+1/3.72)]=1/[0.9216*0.5376]=1/0.4955=2.0182

It was then determined that the calculated OMFP was approximately equal to the selected overall mean flow pore size for tailoring the multilayered nano-fibrous filtration media. The two layers were then adjacently layered together. The OMFP of the layered filtration media was then measured and found to be about 1.97 μm. The measured OMFP was compared to the selected OMFP and was determined to be approximately equal to and slightly less than the selected OMFP. Therefore, the method for making a tailored multi-layered nano-fibrous filtration media comprising at least two adjacent layers of nano-fibrous media was concluded.

Example 2

A tailored multilayered nano-fibrous filtration media was prepared. An overall mean flow pore size (OMFP) for tailoring the multilayered nano-fibrous filtration media was selected to be a nominal 1 μm. Three layers were chosen for layering, each layer having a MFP size, or diameter d, of 2.45 μm and a porosity, ε, of 0.96.

An overall mean flow pore size of the tailored multilayered nano-fibrous filtration media was calculated using the equation:

$$OMFP = 1 \Big/ \prod_1^n \varepsilon_i \left( \sum_1^n \frac{1}{d_i} \right)$$

wherein OMFP is the calculated overall mean flow pore size of multilayered nano-fibrous filtration media:
$\varepsilon_i$ is the porosity of each chosen nano-fibrous media layer;
$d_i$ is the pore diameter of each chosen nano-fibrous media layer; and
n is the total number of chosen nano-fibrous media layers.
In this example, $d_1=d_2=d_3=2.45$ μm and $\varepsilon_1=\varepsilon_2=\varepsilon_3=0.96$ and the calculated OMFP was calculated to be approximately 1 as follows:

OMFP=1/[(0.96*0.96*0.96)*(1/2.45+1/2.45+1/2.45)]
=1/[0.8847*1.2245]=1/1.0833=0.9231

It was then determined that the calculated OMFP was approximately equal to the selected overall mean flow pore size for tailoring the multilayered nano-fibrous filtration media.

The three layers were then adjacently layered together. The OMFP of the layered filtration media was then measured and found to be about 0.974 μm. The measured OMFP was compared to the selected OMFP and was determined to be approximately equal to and slightly less than the selected OMFP. Therefore, the method for making a tailored multilayered nano-fibrous filtration media comprising at least two adjacent layers of nano-fibrous media was concluded.

Example 3

A tailored multilayered nano-fibrous filtration media was prepared. An overall mean flow pore size (OMFP) for tailoring the multilayered nano-fibrous filtration media was selected to be 1 μm. Three layers were initially chosen for layering, one layer having a MFP size, or diameter d, of 2.45 μm and a porosity, ε, of 0.96 and two layers having a MFP size, or diameter d, of 3.72 μm and a porosity, ε, of 0.96.

An overall mean flow pore size of the tailored multilayered nano-fibrous filtration media was calculated using the equation:

$$OMFP = 1 \Big/ \prod_1^n \varepsilon_i \left( \sum_1^n \frac{1}{d_i} \right)$$

wherein OMFP is the calculated overall mean flow pore size of multilayered nano-fibrous filtration media:
$\varepsilon_i$ is the porosity of each chosen nano-fibrous media layer;

$d_i$ is the pore diameter of each chosen nano-fibrous media layer; and n is the total number of chosen nano-fibrous media layers.

In this example, $d_1$=2.45 μm, $d_2$=$d_3$=3.72 μm, and $\varepsilon_1$=$\varepsilon_2$=$\varepsilon_3$=0.96 and the calculated OMFP was calculated to be in excess of 1 as follows:

OMFP=1/[(0.96*0.96*0.96)*(1/2.45+1/3.72+1/3.72)]
=1/[0.8847*0.9458]=1/.8637=1.1578

It was then determined that the calculated OMFP was not approximately equal to the selected overall mean flow pore size of 1 μm. Three layers were subsequently chosen for layering, each layer having a MFP size, or diameter d, of 2.45 μm and a porosity, ε, of 0.96. With the subsequently chosen layers, $d_1$=$d_2$=$d_3$=2.45 μm and $\varepsilon_1$=$\varepsilon_2$=$\varepsilon_3$=0.96 and the calculated OMFP was calculated to be approximately 1 as follows:

OMFP=1/[(0.96*0.96*0.96)*(1/2.45+1/2.45+1/2.45)]
=1/[0.8847*1.2245]=1/1.0833=0.9231

It was then determined that the calculated OMFP was approximately equal to the selected overall mean flow pore size for tailoring the multilayered nano-fibrous filtration media.

The three layers were then adjacently layered together. The OMFP of the layered filtration media was then measured and found to be about 0.974 μm. The measured OMFP was compared to the selected OMFP and was determined to be approximately equal to and slightly less than the selected OMFP. Therefore, the method for making a tailored multilayered nano-fibrous filtration media comprising at least two adjacent layers of nano-fibrous media was concluded.

In the event that the measured OMFP is determined not to be less than or equal to the selected overall mean flow pore size for tailoring the multilayered nano-fibrous filtration media then the above method may repeated with choosing a different number of layers or a nano-fibrous media layer having a different porosity or mean flow pore size. The method may be followed until finally chosen nano-fibrous media layers are determined to have a measured OMFP less than or equal to the selected overall mean flow pore size for tailoring the multilayered nano-fibrous filtration media.

The present disclosure discloses a method for making a tailored multilayered nano-fibrous filtration media comprising at least two adjacent layers of nano-fibrous media, the tailored multilayered nano-fibrous filtration media made according to the presently disclosed method, and a tailored multilayered nano-fibrous filtration media comprising at least two adjacent nano-fibrous media layers and having an actual overall mean flow pore size approximately equal to a calculated overall mean flow pore size.

The presently disclosed method for making a tailored multilayered nano-fibrous filtration media comprising at least two adjacent layers of nano-fibrous media comprising the steps of: a) selecting an overall mean flow pore size for tailoring the multilayered nano-fibrous filtration media; b) choosing a first layer of nano-fibrous media having a first porosity and a first mean flow pore size; c) choosing an i-th layer of nano-fibrous media having an i-th porosity and an i-th mean flow pore size; d) calculating an overall mean flow pore size of the tailored multilayered nano-fibrous filtration media using equation 6, shown above, e) determining if the calculated OMFP is approximately equal to the selected overall mean flow pore size for tailoring the multilayered nano-fibrous filtration media; f) if the calculated OMFP is not approximately equal to the selected overall mean flow pore size for tailoring the multilayered nano-fibrous filtration media then repeating steps b) through e) until finally chosen nano-fibrous media layers are determined to have a calculated OMFP approximately equal to the selected overall mean flow pore size for tailoring the multilayered nano-fibrous filtration media, wherein each repetition of steps b) through e) a different number of layers are chosen or at least one of the steps b) and c) comprise choosing a nano-fibrous media layer having a porosity or mean flow pore size different than the previously chosen layer of nano-fibrous media; and g) adjacently layering each finally chosen layer of nano-fibrous media.

The method may further comprise h) measuring the overall mean flow pore size of the adjacently layered finally chosen layers of nano-fibrous media; i) determining if the measured OMFP is less than or equal to the selected overall mean flow pore size for tailoring the multilayered nano-fibrous filtration media; j) if the measured OMFP is not less than or equal to the selected overall mean flow pore size for tailoring the multilayered nano-fibrous filtration media then repeating steps b) through i), wherein a different number of layers are chosen or at least one of the steps b) and c) comprise choosing a nano-fibrous media layer having a porosity or mean flow pore size different than the previously chosen layer of nano-fibrous media, until finally chosen nano-fibrous media layers are determined to have a measured OMFP less than or equal to the selected overall mean flow pore size for tailoring the multilayered nano-fibrous filtration media. Steps h)-j) may be advantageous for implementation of quality control in production of the presently presented method for making a tailored multilayered nano-fibrous filtration media.

The tailored multilayered nano-fibrous filtration media may have 2, 3, 4, 5, or more layers of nano-fibrous media, and may provide a desired or selected mean flow pore size and/or a desired or selected pore size distribution. The layers of nano-fibrous media may be the same or different. For example and as described herein, having multiple layers, as opposed to a single layer, provides the multilayered nano-fibrous filtration media with a narrower pore size distribution. The tailored multilayered nano-fibrous filtration media of the present disclosure may have a pore size distribution narrower than a pore size distribution of a nano-fibrous filtration media having less layers. In at least one embodiment of the present disclosure, the tailored multilayered nano-fibrous filtration media may comprise a chosen number of layers to provide a selected a pore size distribution. In at least one other embodiment, the tailored multilayered nano-fibrous filtration media has an actual pore size distribution narrower than its calculated pore size distribution.

In at least one other embodiment of presently disclosed tailored multilayered nano-fibrous filtration media, the tailored multilayered nano-fibrous filtration media has at least two adjacent nano-fibrous media layers and an actual overall mean flow pore size approximately equal to a calculated overall mean flow pore size.

The invention claimed is:

1. A method for making a tailored multilayered ePTFE filtration media comprising at least two adjacent layers of ePTFE media, the method comprising the steps of:
   a) selecting an overall mean flow pore size for tailoring the multilayered ePTFE filtration media;
   b) choosing a first layer of ePTFE media having a first porosity and a first mean flow pore size;
   c) choosing an i-th layer of ePTFE media having an i-th porosity and an i-th mean flow pore size;

d) calculating an overall mean flow pore size of the tailored multilayered ePTFE filtration media using the equation:

$$OMFP = 1 \Big/ \prod_1^n \varepsilon_i \left( \sum_1^n \frac{1}{d_i} \right)$$

wherein OMFP is the calculated overall mean flow pore size of multilayered ePTFE filtration media:
$\varepsilon_i$ is the porosity of each chosen ePTFE media layer;
$d_i$ is the pore diameter of each chosen ePTFE media layer; and
n is the total number of chosen ePTFE media layers;
e) determining if the calculated OMFP is approximately equal to the selected overall mean flow pore size for tailoring the multilayered ePTFE filtration media;
f) if the calculated OMFP is not approximately equal to the selected overall mean flow pore size for tailoring the multilayered ePTFE filtration media then repeating steps b) through e) until finally chosen ePTFE media layers are determined to have a calculated OMFP approximately equal to the selected overall mean flow pore size for tailoring the multilayered ePTFE filtration media, wherein each repetition of steps b) through e) a different number of layers are chosen or at least one of the steps b) and c) comprise choosing a ePTFE media layer having a porosity or mean flow pore size different than the previously chosen layer of ePTFE media; and
g) adjacently and directly layering each finally chosen layer of ePTFE media together without binders, wherein a surface of one of the finally chosen layers is in direct contact with a surface of an adjacently chosen layer melted fibers, or other bonding materials therebetween.

2. The method for making a tailored multilayered ePTFE filtration media of claim 1 further comprising the steps of:
h) measuring the overall mean flow pore size of the adjacently layered finally chosen layers of ePTFE media;
i) determining if the measured OMFP is less than or equal to the selected overall mean flow pore size for tailoring the multilayered ePTFE filtration media;
j) if the measured OMFP is not less than or equal to the selected overall mean flow pore size for tailoring the multilayered ePTFE filtration media then repeating steps b) through i), wherein a different number of layers are chosen or at least one of the steps b) and c) comprise choosing a ePTFE media layer having a porosity or mean flow pore size different than the previously chosen layer of ePTFE media, until finally chosen ePTFE media layers are determined to have a measured OMFP less than or equal to the selected overall mean flow pore size for tailoring the multilayered ePTFE filtration media.

3. The method for making a tailored multilayered ePTFE filtration media of claim 1 comprising choosing at least three layers of ePTFE media.

4. The method for making a tailored multilayered ePTFE filtration media of claim 1 wherein the finally chosen layers of ePTFE media have substantially the same porosity and substantially the same mean flow pore size.

5. The method for making a tailored multilayered ePTFE filtration media of claim 1 wherein at least two of the finally chosen layers of ePTFE media have a different porosity or a different mean flow pore size.

6. The method for making a tailored multilayered ePTFE filtration media of claim 1 wherein the tailored multilayered ePTFE filtration media has a pore size distribution narrower than a pore size distribution of a ePTFE filtration media having less layers.

7. The method for making a tailored multilayered ePTFE filtration media of claim 6 further comprising a step of selecting a pore size distribution of the tailored multilayered ePTFE filtration media.

8. The method for making a tailored multilayered ePTFE filtration media of claim 7 further comprising a step of choosing the number of layers of ePTFE media to provide the tailored multilayered ePTFE filtration media with the selected pore size distribution.

9. The method for making a tailored multilayered ePTFE filtration media of claim 8 wherein the tailored multilayered ePTFE filtration media has an actual pore size distribution narrower than its calculated pore size distribution.

10. The method for making a tailored multilayered ePTFE filtration media of claim 1 wherein the tailored multilayered ePTFE filtration media has an actual overall mean flow pore size less than its selected OMFP.

* * * * *